(12) United States Patent
Phillips et al.

(10) Patent No.: US 9,712,408 B2
(45) Date of Patent: Jul. 18, 2017

(54) BANDWIDTH MANAGEMENT IN A CONTENT DISTRIBUTION NETWORK

(71) Applicant: ERICSSON TELEVISION INC., Duluth, GA (US)

(72) Inventors: Chris Phillips, Hartwell, GA (US); Jennifer Ann Reynolds, Duluth, GA (US); Charles Hammett Dasher, Lawrenceville, GA (US); Robert Hammond Forsman, Sugar Hill, GA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 201 days.

(21) Appl. No.: 14/215,330

(22) Filed: Mar. 17, 2014

(65) Prior Publication Data
US 2015/0263916 A1    Sep. 17, 2015

(51) Int. Cl.
*G06F 15/173*    (2006.01)
*H04L 12/26*    (2006.01)
(Continued)

(52) U.S. Cl.
CPC .......... *H04L 43/08* (2013.01); *H04L 65/4084* (2013.01); *H04L 65/80* (2013.01);
(Continued)

(58) Field of Classification Search
CPC ..... H04L 43/08; H04L 43/10; H04L 43/0876; H04L 43/0882; H04L 43/16; H04L 47/822; H04L 12/2418; H04L 12/2602; H04L 12/2668; H04L 65/80; H04L 67/10; H04L 65/4084; H04L 41/0896; H04N 21/2402; H04N 21/26216; H04N 21/64738;
(Continued)

(56) References Cited

U.S. PATENT DOCUMENTS 5,166,927 A * 11/1992 Iida .................... H04L 45/08
                                                      370/238
6,321,260 B1 * 11/2001 Takeuchi ............ H04L 12/5695
                                                      709/223

(Continued)

FOREIGN PATENT DOCUMENTS

WO    WO 2013/171616 A2    11/2013
WO    WO 2014/033565 A1    3/2014

*Primary Examiner* — Liangche A Wang
*Assistant Examiner* — Johnny Aguiar

(57) ABSTRACT

A system and method in which each node in a Content Distribution Network (CDN) maintains information about the most-recent state of the CDN as a whole to decide what bandwidth to use when serving a content subscriber so that the total bandwidth of the entire multimedia content streamed/delivered to the subscriber through various nodes in the CDN remains within a pre-defined bandwidth cap for the subscriber. The entire CDN is thus treated as a single edge node. Each node in a CDN may periodically transmit to all other nodes in the CDN, information about any activity that occurs at the transmitting node. Instead of reporting to all the nodes, the transmitting node may report details of its node-specific activity to a subset of "interested" nodes. Once each node has a model of what the entire CDN system is currently doing, that node can implement bandwidth management in a coherent manner.

9 Claims, 7 Drawing Sheets

(51) Int. Cl.

| | |
|---|---|
| *H04L 29/08* | (2006.01) |
| *H04L 29/06* | (2006.01) |
| *H04N 21/24* | (2011.01) |
| *H04N 21/647* | (2011.01) |
| *H04N 21/2225* | (2011.01) |
| *H04N 21/262* | (2011.01) |
| *H04N 21/442* | (2011.01) |
| *H04L 12/24* | (2006.01) |

(52) U.S. Cl.
CPC ......... *H04L 67/10* (2013.01); *H04N 21/2225* (2013.01); *H04N 21/2402* (2013.01); *H04N 21/26216* (2013.01); *H04N 21/64738* (2013.01); *H04L 12/2668* (2013.01); *H04L 41/0896* (2013.01); *H04L 43/0876* (2013.01); *H04L 43/0882* (2013.01); *H04L 43/10* (2013.01); *H04L 43/16* (2013.01); *H04N 21/44209* (2013.01)

(58) Field of Classification Search
CPC ......... H04N 21/44209; H04N 21/2225; H04N 2021/225; H04N 21/2385; H04W 72/0453; H04W 24/08; H04W 28/20
USPC ....... 709/217, 219, 223, 225, 226, 228, 231, 709/232, 233, 235, 224; 370/229, 230, 370/230.1, 235, 252, 395.21, 395.41, 464, 370/465, 468, 477; 725/95
See application file for complete search history.

(56) References Cited

U.S. PATENT DOCUMENTS

| | | | |
|---|---|---|---|
| 2005/0039213 A1* | 2/2005 | Matarese | H04N 7/17336 725/95 |
| 2009/0022064 A1* | 1/2009 | Oron | H04L 41/0896 370/253 |
| 2010/0095015 A1* | 4/2010 | Zuckerman | H04L 67/1008 709/231 |
| 2011/0022682 A1 | 1/2011 | Zanger et al. | |
| 2011/0179186 A1 | 7/2011 | Li et al. | |
| 2012/0106336 A1* | 5/2012 | Han | H04L 47/22 370/230.1 |
| 2012/0195209 A1* | 8/2012 | Jain | H04L 41/0896 370/252 |
| 2013/0088968 A1* | 4/2013 | Kim | H04L 47/11 370/235 |
| 2013/0227625 A1 | 8/2013 | Forsman et al. | |
| 2014/0280764 A1 | 9/2014 | Dasher et al. | |

* cited by examiner

BANDWIDTH MANAGEMENT IN A CONTENT DISTRIBUTION NETWORK

TECHNICAL FIELD

The present disclosure relates to communication systems. Particular embodiments of the present disclosure are directed to a system and method for bandwidth management in a Content Distribution Network (CDN).

BACKGROUND

A Content Distribution Network (CDN) (also referred to in the literature as a "Content Delivery Network") is a large distributed system of servers deployed in multiple data centers across the Internet. The goal of a CDN is to serve content to end-users with high availability and high performance. CDNs serve a large fraction of the content available on the Internet today. Such content includes, for example, web objects (e.g., text, graphics, scripts, and the like), downloadable objects (e.g., media files, data files, software, documents, and the like), applications (e.g., e-commerce, web portals, and the like), live streaming media, on-demand streaming media, content associated with social networks, and the like.

FIG. 1 illustrates a content delivery system 12 employing a CDN 14. The content may be delivered to a content subscriber 16 (e.g., a cable subscriber, a client of a broadband service provider or a telephone company, and the like) via a delivery platform 18. The content may be multimedia content. The term "multimedia content," as used herein, may include, for example, data content having audio-visual segments, audio-only components, video-only components, other non-audiovisual components (such as, for example, plain data, game data and other executables, supercollider data, and the like), or a combination of one or more of these segments/components. In the discussion herein, the terms "multimedia content" and "content" may be used interchangeably.

Traditionally, audio-visual or other multimedia services offered or provided by telephone companies and cable operators have been distributed over managed access lines where the bandwidth required for a good quality of experience has been provisioned and is suitably robust. However, there are now many types of Internet-connected devices that are capable of high quality audio/video playback. These include, for example, smart TVs, gaming consoles, PCs, laptops, tablets, smartphones, Blu-Ray™ devices, and the like. Hence, multimedia content providers such as media companies and e-commerce vendors are increasingly making their content available directly on the Internet via third-party services such as Hulu™ or Netflix™. These third-party services, in turn, use/deploy CDNs to deliver this received content (indicated by arrow 20 in FIG. 1) to the end-user 16. The content providers pay these third-party services (which may be owners or operators CDNs) for delivering the provider's content to the corresponding audience of end-users. The CDN 14 may use the delivery platform 18, which may include, for example, a portion of the Internet, an Internet Service Provider's (ISP) network, a cable or television service provider's network (in which case the content may be said to be delivered "Over-The-Top" (OTT) of an operator's network), and the like. The CDN operator or owner may pay ISPs, carriers, and network operators for hosting its servers in their data centers (not shown) to facilitate delivery of the content 20. Besides better performance and availability, CDNs also offload the traffic served directly from the content provider's origin infrastructure, resulting in cost savings for the content provider. In addition, CDNs provide the content provider a degree of protection from Denial of Service (DoS) attacks by using their large distributed server infrastructure to absorb the attack traffic.

A CDN may be comprised of various "nodes" that transmit and cache multimedia content as is appropriate. In FIG. 1, such "nodes" are identified by reference numerals 22 through 31. Some of the nodes may function as regional server nodes (e.g., nodes 23-25 in FIG. 1), some others may function as edge nodes (e.g., nodes 26-31 in FIG. 1), whereas there may be at least one node in the CDN 14 functioning as an origin server (e.g., the origin server 22 in FIG. 1) that is the primary recipient of the content 20 input to the CDN 14 and may be responsible for the received content's subsequent distribution to appropriate regional/edge nodes. The content is then transmitted from the appropriate node to the end user 16. Various pieces of content are stored, e.g., by the origin server 22, in various (sometimes redundant) nodes in the CDN. For example, content that is more popular (i.e., requested more often) may be pushed to the edge nodes 26-31 at a local level, while less popular content may be stored in the regional nodes 23-25 at a regional level, and still less popular content may be stored at a "higher" node in the hierarchy—e.g., at the origin server 22 itself. Content sent to an edge node is meant to be retrieved by end users physically close to that node. It is possible that two users (even in the same household or location) may retrieve the same content from two completely different node servers.

Adaptive Bit Rate (ABR) streaming is a technique used in streaming multimedia content over computer networks. ABR may be used to deliver content over the combination of the CDN 14 and the delivery platform/network 18. Adaptive streaming technologies are primarily based on Hypertext Transfer Protocol (HTTP) and designed to work efficiently over large distributed HTTP networks, such as the Internet. Thus, in the discussion below, the terms "streamed" or "adaptively-streamed" or "ABR-streamed" (or terms of similar import) may be used interchangeably to refer to a multimedia content delivered through adaptive streaming, which may include ABR HTTP downloads or any other similar network-based content delivery method.

In ABR streaming, a user device's bandwidth and processing capacity are detected in real time, and the quality of multimedia stream is adjusted accordingly. The source audio-visual content is encoded at multiple bitrates, and then each of the different bitrate streams is segmented into small multi-second (e.g., 2 to 10 seconds) parts. A manifest file is provided to the streaming client. The manifest file makes the client device aware of the available streams at different bitrates, and segments of the streams. The player client can thus switch between streaming the different encodings depending on available network resources. For example, when the network throughput has deteriorated, the client device may find that the download speed for a currently-downloaded segment is lower than the bitrate specified for that segment in the manifest file. In that event, the client device may request that the next segment be at that lower bitrate. Similarly, if the client finds that the download speed of the currently-downloaded segment is greater than the manifest file-specified bitrate of the segment downloaded, then the client may request that next segments be at that higher bitrate.

Some examples of ABR streaming solutions include the MPEG-DASH standard (where "MPEG" refers to Moving Picture Experts Group and "DASH" refers to Dynamic Adaptive Streaming over HTTP), the HTTP Live Streaming (HLS) solution offered by Apple, Inc. for iPhones and iPads, and the Smooth Streaming solution offered by Microsoft, Inc.

As noted earlier, in adaptive streaming, multiple versions of a video/audio-visual content are offered at different bitrates or quality levels (e.g., from 100 Kbps (kilo bits per second) to 2 Mbps (mega bits per second)). Thus, for example, video is transported not as one big file, but as separate, distinct chunks (e.g., by "cutting" up the video in small files), and user-agents are allowed to seamlessly switch between quality levels specified in a manifest file (e.g., based upon changing device or network conditions), simply by downloading the next chunk from a different bitrate level.

Thus, in ABR streaming, videos (or audio-visual data) are served as separate, small chunks, and the accompanying manifest file provides metadata needed for the client's ABR player. The manifest file may be an Extensible Markup Language (XML) file. The media server that provides the ABR streaming may automatically adapt to any changes in each user's network and playback conditions. A user agent (in the client's ABR player) may parse the manifest file to appropriately switch between different stream levels (or bitrates). The ABR mode of content delivery is useful in many applications such as, for example, long downloads of video content (where ABR streaming may save bandwidth if the user is not currently watching the video), live video feeds (where ABR streaming may maintain the stability of the content delivery), delivery to mobile devices (where lots of buffering may be needed due to changing network conditions). Adaptive streaming technologies thus allow client devices to adjust or adapt to changes in bandwidth by switching between higher and lower quality video segments indicated within a manifest file.

SUMMARY

While ideal for efficiency purposes, the CDN-network based distributed content model poses challenges when attempting to implement any sort of CDN network-wide bandwidth management schemas, such as the Weighted Fair Network Queuing (WFNQ) (also referred to hereinbelow as Weighted Fair Queuing (WFQ)) approach disclosed in the U.S. Pat. No. 8,549,570, titled "Methods and Apparatus for Managing Network Resources used by Multimedia Streams in a Virtual Pipe." Because each network node in a CDN only knows its own state, delivery of distributed content is difficult to manage. As a result, comprehensive system-wide network bandwidth management policies have not yet been implemented in current CDN networks.

On the other hand, in the ABR streaming through manifest manipulation, the bandwidth management is a "best effort" approach, with no guarantee of success.

A CDN traffic redirection approach is discussed in co-owned and co-pending U.S. patent application Ser. No. 13/845,320 entitled, "Bandwidth Management for Over-The-Top Adaptive Streaming," filed on Mar. 18, 2014. In that approach, a CDN may include a CDN redirector server that may receive requests for content from client devices (such as stationary devices located at a customer premises (e.g., a television or a gaming console) or mobile devices (such as a smartphone or a tablet computer)), and may redirect the requests to an appropriate delivery node—e.g., a regional node or an edge node. For example, if the CDN redirector server determines that a client request is not to be redirected to an edge server due to a lack of content popularity, then the request may be redirected to a regional server that is geographically closest to the customer premises. However, if the content popularity is, for example, above a threshold level (measured for example by the number of requests for the content over a given time period), the CDN redirector server may determine instead that the client request should be redirected to a CDN edge server that is located geographically closest to the customer premises.

The above-mentioned CDN redirector may redirect all multimedia streams going into a subscriber's home/premises to a specific edge node where a virtual pipe either existed (e.g., due to someone in the home already watching a video being delivered through the CDN) or it would create an instance of the virtual pipe from the specific edge node (if no one was watching the video). The multimedia streams may be coming from different CDN nodes, but the virtual pipe may eventually exist from a single edge node. Although bandwidths of individual sessions within such CDN distributed virtual pipe (which may have a pre-allocated pipe size) may be managed in this manner, such redirections to single nodes may not be desirable or possible every time. For example, in case more than one node is currently serving a client, it may be desirable not to disrupt or delay such content delivery through the single node-based redirection. Also, in the CDN redirection approach mentioned here, Quality of Service (QoS) implementation may not be possible because of the realistic presence of mixed bitrates in the content/sessions delivered through the virtual pipe. For example, in case of a virtual pipe of 7 Mbps size, the total bandwidth may have been divided between three client devices—one device receiving the content stream at 5 Mbps and each of the other two receiving its content at 1 Mbps. The content for each client device may come from a different CDN node. Hence, the single node at which a virtual pipe exists may not be able to implement a pipe-wide uniform QoS policy applicable to all sessions within the pipe because of the different bitrates from different sources having their own QoS policies.

It is therefore desirable to create just one virtual pipe, effectively treating the entire CDN as a single edge node. This is in contrast to the above-described redirection approach where a node-specific virtual pipe exists for different nodes in the CDN. When a CDN is treated as a single node, it not only provides another bandwidth management option to the redirection approach discussed above, but also allows for desired QoS implementation.

Thus, particular embodiments of the present disclosure are directed to a system and a method in which each node in a CDN maintains information about the most-recent state of the CDN as a whole in order to decide what bandwidth to use when serving a content subscriber so that the total bandwidth of the entire content delivered to the subscriber through various nodes in the CDN remains within a pre-defined bandwidth cap for the subscriber.

In one embodiment, the present disclosure is directed to a method of managing a total bandwidth allocated to a content subscriber receiving multimedia content from one or more nodes in a CDN. The method comprises performing the following: (i) maintaining at each node in the CDN, the most-recent state of the CDN as a whole; (ii) at each node serving the content subscriber, using information about the most-recent state of the CDN as a whole to monitor an individual bandwidth at which each of the other nodes that also serves the content subscriber is providing a corresponding portion of the multimedia content to the content subscriber; and (iii) at each node serving the content subscriber, providing the serving node's node-specific portion of subscriber-requested multimedia content using a delivery bandwidth such that the total bandwidth remains within a pre-defined bandwidth cap for the content subscriber, wherein the total bandwidth is the summation of the delivery bandwidth and each individual bandwidth utilized by each of the other nodes serving the content subscriber.

Thus, in one embodiment of the present disclosure, a system is created wherein each node in a CDN transmits to all other nodes in the CDN, at regular time intervals, information about any activity (for example, bytes transmitted or bandwidth-management related metadata information) that occurs at the transmitting node. Each node in the CDN may then model the entire system/network as a whole in order to decide how to act according to a set of global bandwidth management rules. In another embodiment, instead of transmitting details of node-specific activity to every other node, the transmitting node may rather report the requisite information to a subset of "interested" nodes for the purpose of maintaining a coherent model of a subset of the overall network state. The "interested" nodes may be those nodes that are currently serving the same content subscriber as the transmitting node. Thus, a reporting node may either globally broadcast node-specific bandwidth accounting information or may perform interest-based multicast of accounting information.

In another embodiment, the present disclosure relates a method of managing a total bandwidth allocated to a content subscriber receiving multimedia content from one or more nodes in a CDN. The method comprises performing the following: (i) each node in the CDN periodically reporting the most-recent state of the reporting node's node-specific activity to all other nodes in the CDN, thereby allowing each node in the CDN to maintain information about the most-recent state of each of the other nodes in the CDN; (ii) at each node serving the content subscriber, using data from the periodic reporting to monitor an individual bandwidth at which each of the other nodes that also serves the content subscriber is providing a corresponding portion of the multimedia content to the content subscriber; and (iii) at each node serving the content subscriber, providing the serving node's node-specific portion of subscriber-requested multimedia content using a delivery bandwidth such that the total bandwidth remains within a pre-defined bandwidth cap for the content subscriber, wherein the total bandwidth is the summation of the delivery bandwidth and each individual bandwidth utilized by each of the other nodes serving the content subscriber.

In a further embodiment, the present disclosure is directed to a method of managing a total bandwidth allocated to a content subscriber receiving multimedia content from one or more nodes in a CDN. The method comprises performing the following: (i) each node in the CDN periodically reporting the most-recent state of the reporting node's node-specific activity to a subset of all other nodes in the CDN, wherein the subset of nodes includes only those nodes in the CDN that are also serving the same content subscriber as the reporting node, wherein the periodic reporting allows each node serving the same content subscriber to maintain information about the most-recent state of each of the other nodes also serving the same content subscriber in the CDN; (ii) at each node serving the content subscriber, using data from the periodic reporting to monitor an individual bandwidth at which each of the other nodes that also serves the content subscriber is providing a corresponding portion of the multimedia content to the content subscriber; and (iii) at each node serving the content subscriber, providing the serving node's node-specific portion of subscriber-requested multimedia content using a delivery bandwidth such that the total bandwidth remains within a pre-defined bandwidth cap for the content subscriber, wherein the total bandwidth is the summation of the delivery bandwidth and each individual bandwidth utilized by each of the other nodes serving the content subscriber.

In a still further embodiment, the present disclosure relates to a CDN node for managing a total bandwidth allocated to a content subscriber that receives multimedia content from the CDN through adaptive streaming. The CDN node comprises a processor and a memory that stores computer program instructions, which, when executed by the processor, cause the CDN node to perform the following: (i) carry out one of the following: (a) periodically report the most-recent state of the reporting node's node-specific activity to all other nodes in the CDN, thereby allowing each node in the CDN to maintain information about the most-recent state of each of the other nodes in the CDN, and (b) periodically report the most-recent state of the reporting node's node-specific activity to a subset of all other nodes in the CDN, wherein the subset of nodes includes only those nodes in the CDN that are also serving the same content subscriber as the reporting node; (ii) when serving the content subscriber, use data from the periodic reporting to monitor individual bandwidth at which each of the other nodes that also serves the content subscriber is providing a corresponding portion of the adaptively-streamed multimedia content to the content subscriber; and (iii) when serving the content subscriber, provide the serving node's node-specific portion of subscriber-requested multimedia content using a delivery bandwidth such that the total bandwidth remains within a pre-defined bandwidth cap for the content subscriber, wherein the total bandwidth is the summation of the delivery bandwidth and each individual bandwidth utilized by each of the other nodes serving the content subscriber.

According to the particular embodiments of the present disclosure, once each individual node has a model of what the entire CDN system is currently doing, that node can implement bandwidth management (such as the earlier-mentioned Weighted Fair Network Queuing) in a coherent manner. For example, a subscriber household requesting content from multiple CDN nodes will still have household level bandwidth caps implemented as if a single node were serving them. The present disclosure thus enables bandwidth management across CDN nodes while providing a solution for potential race conditions in the system. This enables network providers to provide bandwidth management schemas to ensure quality of service (QoS) to both the end user and the content owner.

Further features and benefits of embodiments of the present disclosure will become apparent from the detailed description below.

BRIEF DESCRIPTION OF THE DRAWINGS

In the following section, the present disclosure will be described with reference to exemplary embodiments illustrated in the figures, in which.

DETAILED DESCRIPTION

Figure 1:
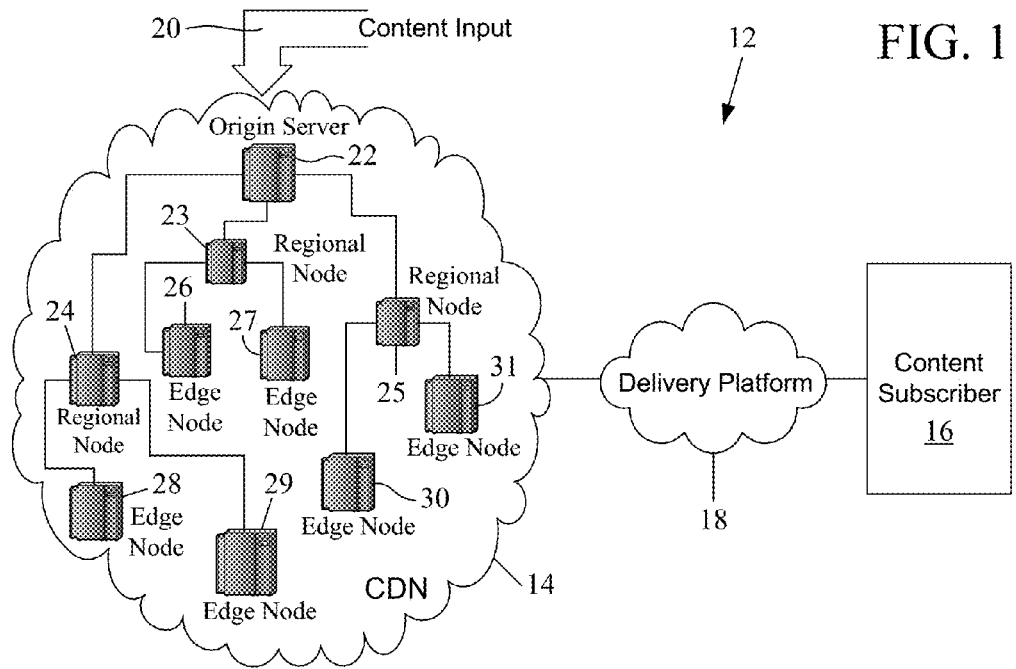
FIG. 1 illustrates a content delivery system employing a CDN.

The present disclosure will now be described more fully hereinafter with reference to the accompanying drawings, in which particular embodiments are shown. The inventive aspects of this disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In the drawings, like reference signs refer to like elements. Additionally, it should be understood that the teachings of the present disclosure can be implemented in hardware or a combination of software stored on a non-transitory memory and executed by a general purpose computer or microprocessor.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term such as "subscriber-requested" or "pre-defined" may be occasionally interchangeably used with its non-hyphenated version, "subscriber requested" or "predefined; and a capitalized entry such as "Quality of Service" may be interchangeably used with its non-capitalized version, "quality of service". Such occasional interchangeable uses shall not be considered inconsistent with each other.

It is noted at the outset that the terms "coupled," "connected", "connecting," "electrically connected," and the like, are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing audio and/or video information or other data/control information) to/from the second entity regardless of the type (analog or digital) of those signals. It is further noted that various figures (including component diagrams) shown and discussed herein are for illustrative purpose only, and are not drawn to scale.

Figure 2:
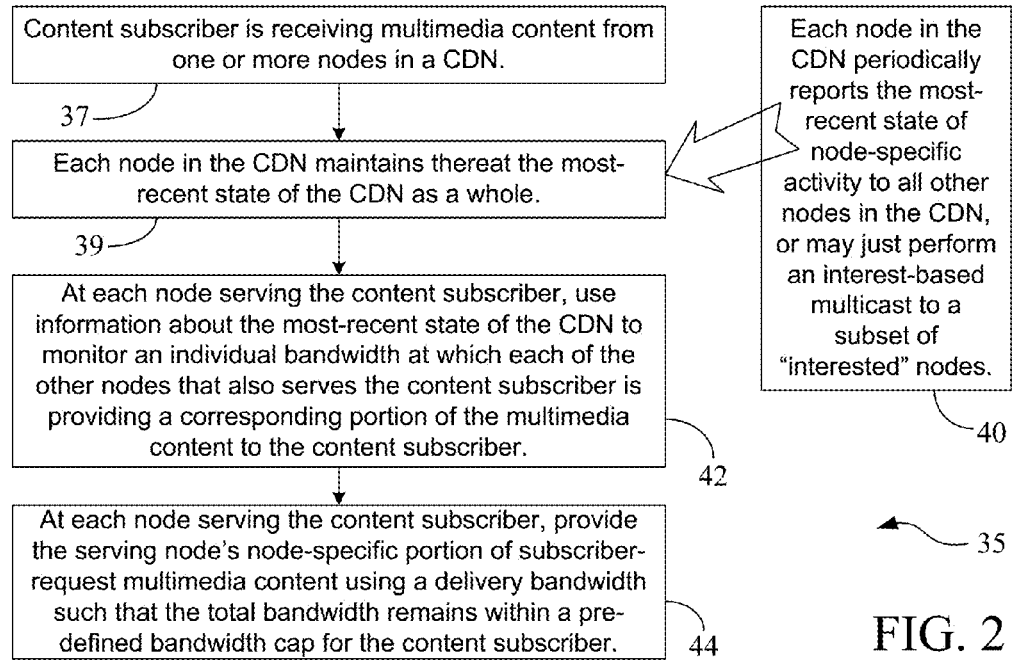
FIG. 2 is an exemplary flowchart depicting various steps of how content delivery bandwidth may be managed in a CDN network according to particular embodiments of the present disclosure.

FIG. 2 is an exemplary flowchart 35 depicting various steps of how content delivery bandwidth may be managed in a CDN network (for example, the CDN network 48 discussed later with reference to FIG. 3) according to particular embodiments of the present disclosure. Initially, as illustrated at block 37, a content subscriber (for example, the content subscriber 16 in FIG. 3) may be in communication with the CDN network and may be receiving multimedia content from one or more nodes in the CDN. As noted at block 39, each node in the CDN may be configured, according to teachings of the present disclosure discussed later below, to maintain thereat the most recent state of the CDN as a whole. In one embodiment, such state may be maintained when each node in the CDN periodically reports the most recent state of its node-specific activity to all other nodes in the CDN as indicated at block 40. As also noted at block 40, in another embodiment, instead of transmitting details of node-specific activity to every other node, the transmitting node may rather report the requisite information to a subset of "interested" nodes for the purpose of maintaining a coherent model of a subset of the overall network state. The "interested" nodes may be those nodes that are currently serving the same content subscriber as the transmitting node. Thus, a reporting node may either globally broadcast node-specific bandwidth accounting information or may perform interest-based multicast of accounting information.

As specified at block 42, at each node serving the content subscriber, the information about the most-recent state of the CDN as a whole may be used to monitor an individual bandwidth at which each of the other nodes that also serves the content subscriber is providing a corresponding portion of the multimedia content to the content subscriber. Thereafter, at each node serving the content subscriber, the serving node's node-specific portion of the subscriber-requested multimedia content may be provided using a delivery bandwidth such that the total bandwidth remains within a pre-defined bandwidth cap for the content subscriber (block 44). Here, the "total bandwidth" refers to the summation of the delivery bandwidth and each individual bandwidth utilized by each of the other nodes serving the content subscriber.

It is noted here that although the discussion below is provided primarily in the context of an ABR-streamed or adaptively-streamed multimedia content, the applicability of the teachings of the present disclosure is not limited only to ABR-streamed content. Rather, the bandwidth management techniques discussed herein provide benefits to the user for both types of data streams—ABR and non-ABR. Some examples of non-ABR streams include software downloads, non-real-time media downloads, and interactive sessions like video games and voice chat.

Figure 3:
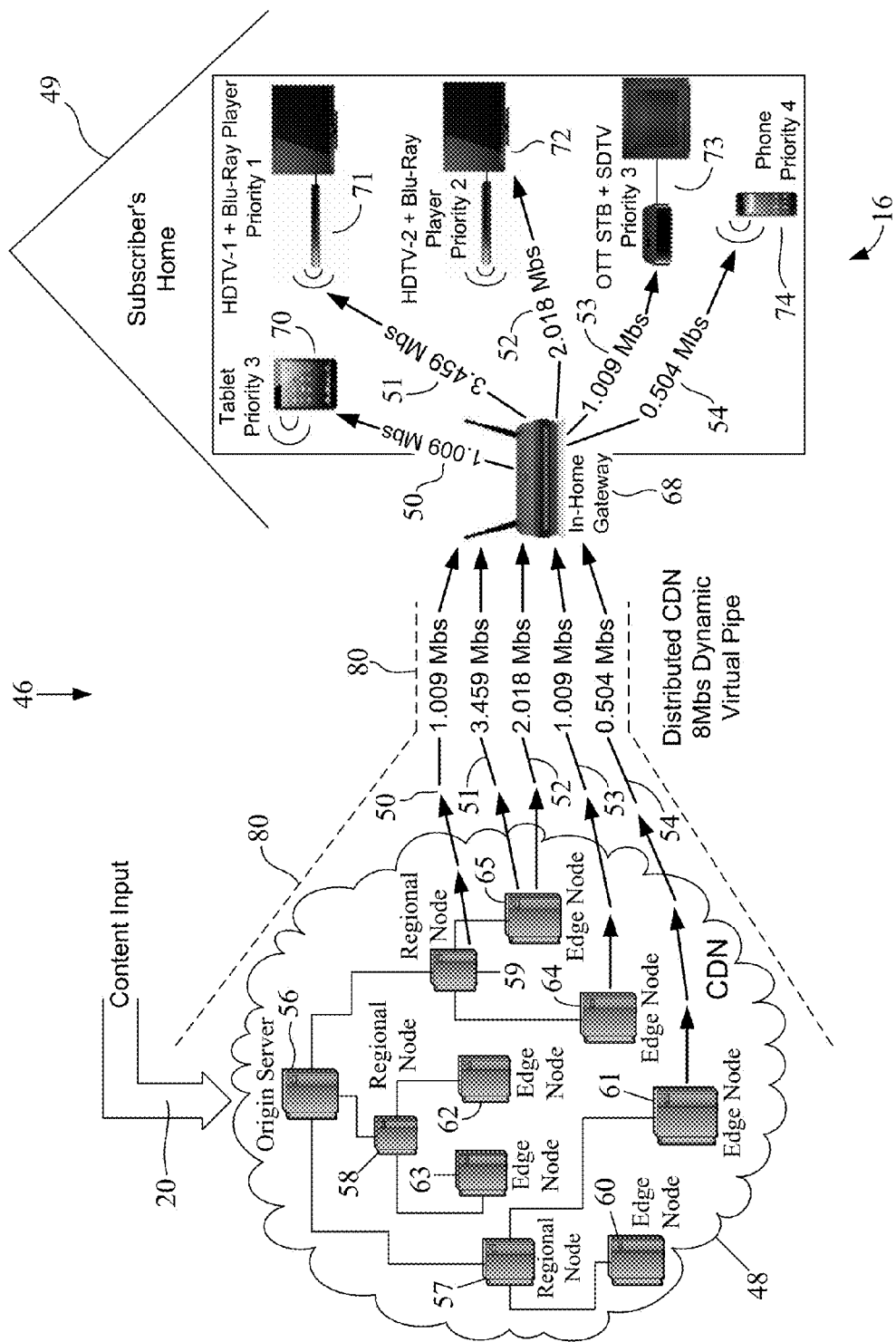
FIG. 3 is an exemplary illustration of a CDN network-wide virtual pipe according to particular embodiments of the present disclosure.

FIG. 3 is an exemplary illustration of a CDN network-wide virtual pipe according to particular embodiments of the present disclosure. A system 46 is shown in FIG. 3 in which a CDN 48 is serving adaptively-streamed multimedia content to the content subscriber 16. As indicated by reference numeral "20," the CDN 48 in FIG. 3, like the CDN 14 in FIG. 1, also may receive the multimedia content from content providers. For ease of illustration, a delivery platform (like the delivery platform 18 in FIG. 1) is not shown between the CDN 48 and the subscriber's home 49. The multimedia content is identified by the set of reference numerals 50 through 54, each reference numeral associated with and referring to a corresponding portion/segment/stream of the total multimedia content being delivered to the subscriber 16. In the embodiment of FIG. 3, the CDN 48 is shown to include a plurality of nodes identified by reference numerals 56 through 65. As in case of the CDN 14 in FIG. 1, the CDN 48 in FIG. 3 also includes an origin server 56, three regional nodes 57-59, and six edge nodes 60-65. The earlier discussion of the CDN 14 and its nodes 22-31 equally applies to the CDN 48 and its nodes 56-65 and, hence, is not repeated herein for the sake of brevity. However, the CDN 48 differs from the CDN 14 in that the nodes 57-65 are additionally configured to implement the CDN-wide bandwidth management approach according to the herein-described teachings of particular embodiments of the present disclosure. The origin server 56 may be a central point of ingest (i.e., content reception) into the CDN 48. The origin server 56 may then distribute the received content to the regional servers/nodes, where the content may be cached. This distribution can either be a "push" to the regional node/server or a "pull" as a result of the client request. The client may be then re-directed to a local regional node/server based on the CDN redirection functionality such as geographical location, regional node activity, etc. The content may be then cached at the corresponding regional server as it is being delivered to the client. Hence, in one embodiment, the origin server 56 may not function as a delivery server to the client, but the regional and edge nodes do. In the embodiment of FIG. 3, individual streams 50-54 of the total multimedia content being delivered to the subscriber's home 49 may be collectively received at a receiver unit such as, for example, a gateway 68, in the subscriber's home. The in-home gateway 68 may then distribute the received multimedia streams 50-54 to corresponding user devices 70-74 that requested the respective content. In the embodiment of FIG. 3, the subscriber's home 49 is shown to include five user devices—a tablet 70, a pair of High Definition Television (HDTV) and a Blu-Ray™ player collectively identified by reference numeral "71," a pair of second HDTV and another Blu-Ray™ player collectively identified by reference numeral "72," a pair of OTT Set-Top Box (STB) and Standard Definition Television (SDTV) collectively identified by reference numeral "73," and a cellular/mobile phone 74. Some of the user devices (for example, the devices 70-72) may communicate wirelessly with the gateway 68, and some (for example, the device 73) may be connected to the gateway 68 via a wired connection.

It is noted here that although the term "content subscriber" primarily refers to a human subscriber of the CDN-delivered multimedia content, for ease of discussion, that term may be loosely used herein to also include and sometimes interchangeably refer to various end user devices (for example, the devices 70-74 in the home 49 of the content subscriber 16) to which the subscribed multimedia content is delivered, the subscriber's home 49 (or other location at which the subscribed multimedia content is delivered), or both, depending on the context of discussion. Thus, for example, the wireless phone 74 may be considered a "content subscriber" even if the phone 74 is not physically present in the subscriber's home 49—i.e., the phone 74 may be mobile and away from home 49 while receiving the streaming multimedia content from the CDN 48. It is understood that the devices 70-74 may not be necessarily owned or operated by the person/persons having subscription for the multimedia content.

In the embodiment of FIG. 3, different bitrates and, hence, different bandwidths, may apply to various portions of the adaptively-streamed multimedia content depending on, for example, the priority assigned to or associated with a particular user device. For example, a user device having the highest priority (i.e., the device 71 with "Priority 1") may receive its portion of the ABR-streamed content at the highest bitrate (i.e., 3.459 Mbps in FIG. 3). Generally, a user device having a higher priority will receive the streamed content at a higher bitrate than a user device having a lower priority. Thus, in case of FIG. 3, the device 72 (with "Priority 2") is shown to receive its portion of the streamed content at 2.018 Mbps whereas each of the devices 70 and 73 (each having the same "Priority 3") receives its corresponding portion of the streamed content at the same bitrate of 1.009 Mbps. The device with the lowest priority—i.e., the device 74 in FIG. 3—receives its share of the content at the lowest bitrate, which is 0.504 Mbps.

It is shown in FIG. 3 that different nodes in the CDN 48 may supply corresponding portions of the total multimedia content being delivered to the devices 70-74 in the subscriber's home 49. Thus, for example, the multimedia stream 50 is shown to be delivered by the regional node 59, the streams 51-52 are delivered by the edge node 65, the stream 53 is delivered by the edge node 64, and the stream 54 is delivered by the edge node 61. When the individual bandwidths of all of these multimedia streams are combined, it is observed that the subscriber-requested content is provided to the subscriber 16 at the total bandwidth of 8 Mbps, which may be the pre-defined bandwidth cap allocated or assigned to the content subscriber 16 for example, by a cable operator or other multimedia content provider having the subscriber 16 as its customer.

The content delivery in the embodiment of FIG. 3 is distributed in nature because more than one node in the CDN 48 directly provides its portion of the multimedia content to the subscriber 16. Such distributed content delivery may be considered to create a CDN-wide virtual pipe (as indicated by the dotted lines identified using the reference numeral "80"), as opposed to a single node-based virtual pipe as in case of the earlier-described CDN traffic redirection approach. As also mentioned earlier, in the CDN traffic redirection approach, the single node eventually delivers the subscriber-requested content in its entirety, and not a plurality of content-supplying nodes individually delivering their portion of the total content as is the case in the CDN-wide virtual pipe-based distributed content delivery approach illustrated in FIG. 3. The virtual pipe 80 in FIG. 3 may be "dynamic" in nature because bitrates of individual streams in the ABR-streamed content delivered to the subscriber's home 49 may change, for example, to comply with a bandwidth cap for the subscriber 16 as per the teachings of the present disclosure as discussed later below. For example, if a certain device in the subscriber's home 49 starts receiving its ABR content stream at a higher/lower bitrate from the corresponding CDN node, another CDN node supplying a different content stream may accordingly adjust its delivery bitrate to maintain the pre-defined bandwidth cap for the subscriber 16.

Figure 4:
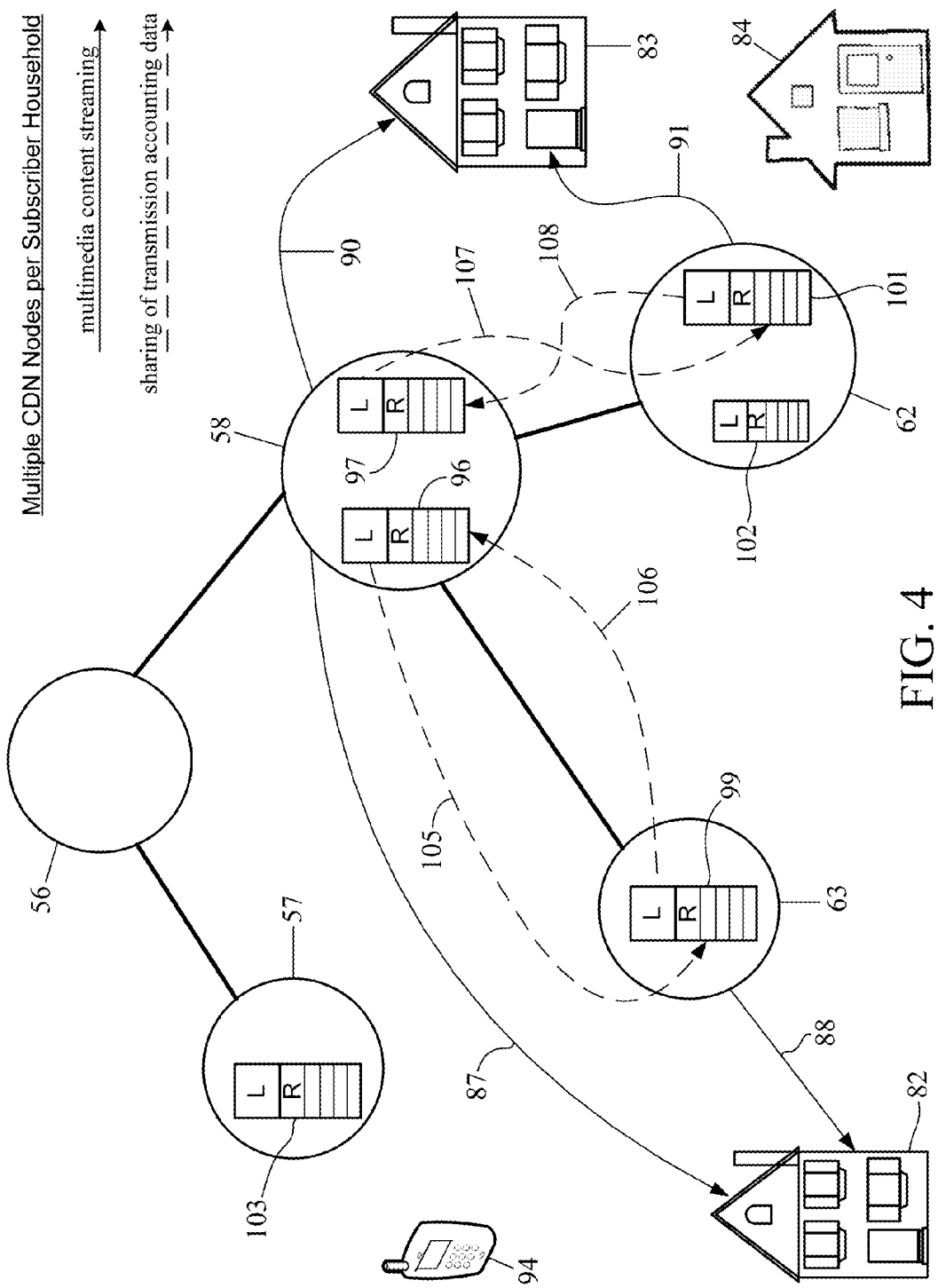
FIG. 4 shows an exemplary inter-node sharing of transmission accounting data according to one embodiment of the present disclosure when multiple CDN nodes deliver content to a subscriber household.
Figure 5:
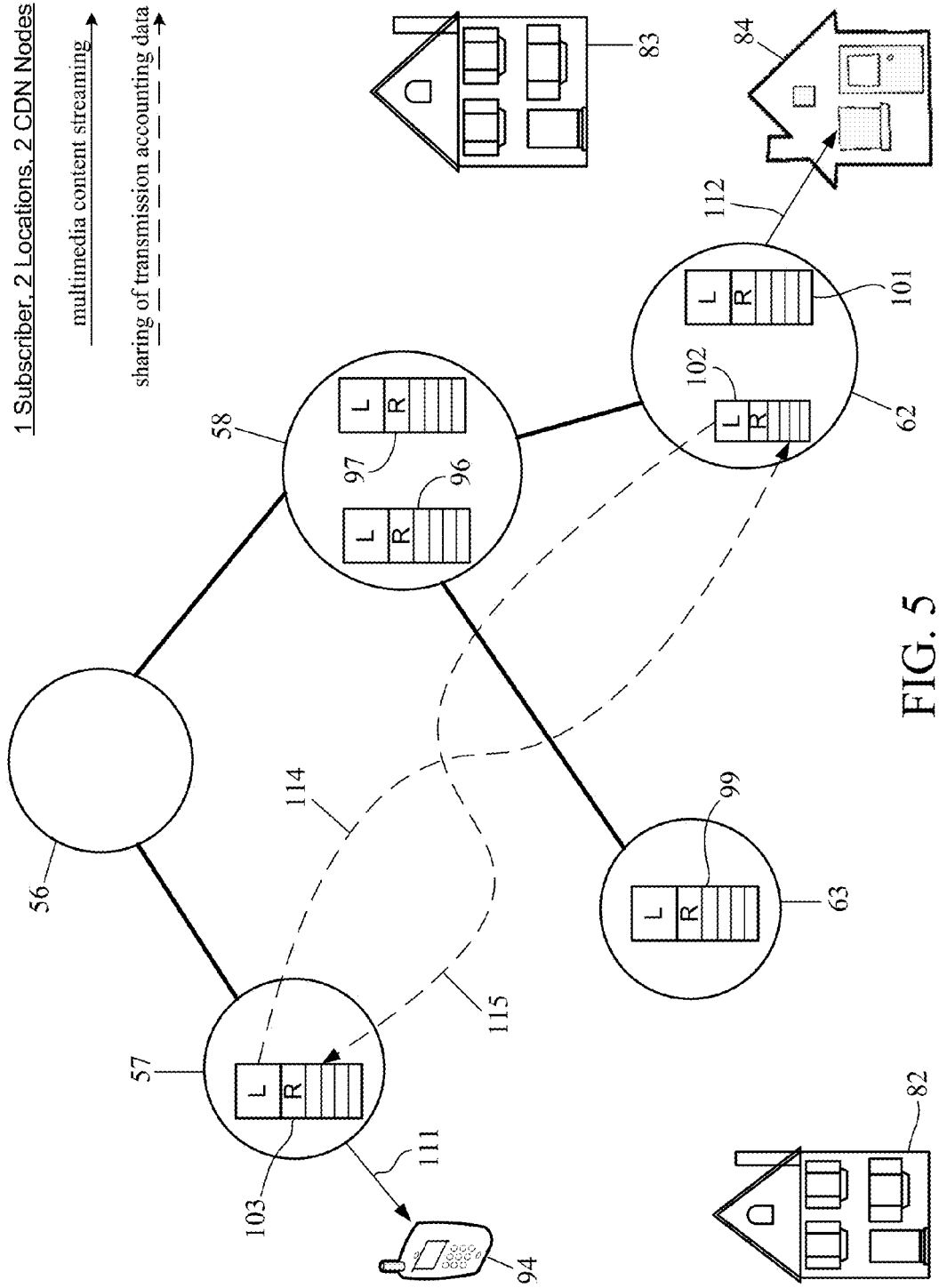
FIG. 5 depicts an exemplary inter-node sharing of transmission accounting data according to one embodiment of the present disclosure when two CDN nodes deliver content to a single subscriber's devices at two different locations.

FIG. 4 shows an exemplary inter-node sharing of transmission accounting data according to one embodiment of the present disclosure when multiple CDN nodes deliver content to a subscriber household. In FIG. 4, only a portion of the CDN 48 is shown—i.e., only five nodes 56-58 and 62-63 are shown—to illustrate the inter-node sharing of transmission accounting data. Three subscriber households 82-84, which may belong to three different content subscribers, are also shown in FIG. 4. Like the subscriber home 49 in FIG. 3, each of these households may have one or more user devices (not shown) requesting and receiving content from one or more nodes in the CDN 48. Two of these households—i.e., households 82 and 83—are shown receiving ABR-streamed multimedia content from multiple CDN nodes. The household 82 receives the content from the CDN nodes 58 an 63, as illustrated by straight lines with arrows identified by reference numerals "87" and "88", respectively. Similarly, the household 83 receives the content from the CDN nodes 58 and 62, as illustrated by straight lines with arrows identified by reference numerals "90" and "91", respectively. In FIG. 4, the third household 84 is not shown as receiving any content from the CDN nodes, however, such a scenario is depicted in FIG. 5, discussed later. It is noted here that although a cell phone 94 shown in FIG. 4 at a different location, it is part of the user devices in the subscriber household 84 as discussed later with reference to FIG. 5.

Figure 6:
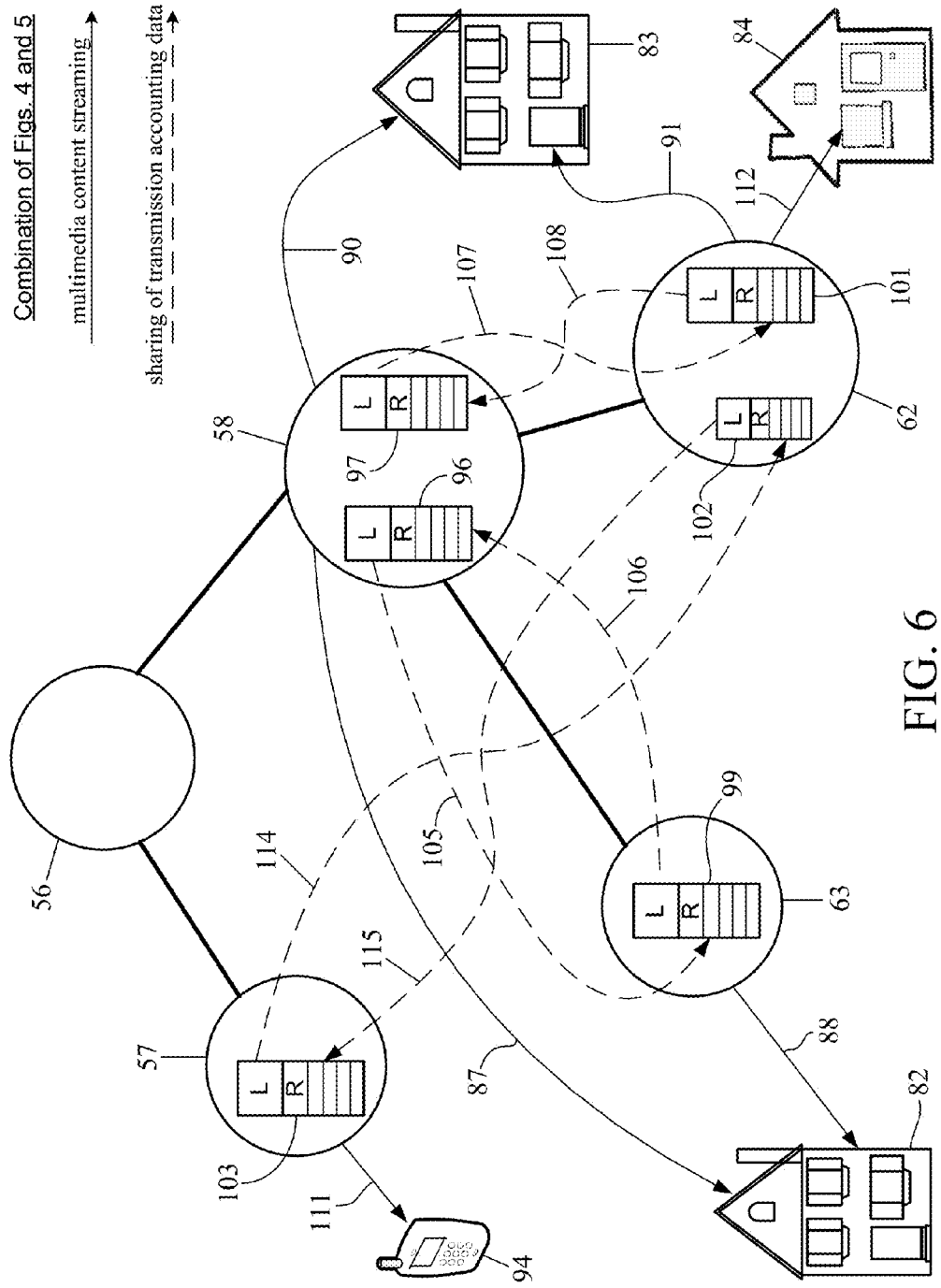
FIG. 6 is a combination of FIGS. 4 and 5.

In the embodiments of FIGS. 4-6, each content-transmitting CDN node is shown to maintain a transmission history or accounting log per subscriber. For example, the node 58 has two such accounting logs—a first subscriber-specific log 96 for the subscriber 82, and a second subscriber-specific log 97 for the subscriber 83. The node 63 is shown to have one such accounting log 99 for the subscriber 82, the node 62 is shown to have two such accounting logs—the log 101 for the subscriber 83 and the log 102 (for the subscriber 84 as shown in FIG. 5 discussed below). Similarly, the node 57 is shown to maintain a subscriber-specific accounting log 103 for the subscriber 84 (also discussed later with reference to FIG. 5). In particular embodiments, each node in the CDN 48 may maintain a subscriber-specific accounting log for each subscriber being served by the CDN 48 (as shown in detail in the exemplary node-specific configuration of FIG. 7 discussed later below). However, for ease of illustration and discussion, only a few accounting logs are shown in FIG. 4. Each of these accounting logs or transmission histories may include entries referring to local accounting data (indicated by letter "L") and remote accounting data (indicated by letter "R").

When a node performs a node-specific activity (for example, bytes streamed to a subscriber device or metadata generated to provide bandwidth management information to other nodes), it may record such activity as its "local" ("L") accounting data and may periodically (for example, at pre-defined time intervals) report such activity to other nodes which store it as "remote" ("R") accounting data. In the embodiment of FIG. 4, some exemplary reporting activities are illustrated by dotted arrows 105 through 108—the dotted arrow 105 associated with the subscriber-specific content 87 for the subscriber 82, the dotted arrow 106 associated with the subscriber-specific content 88 for the subscriber 82, the dotted arrow 107 associated with the subscriber-specific content 90 for the subscriber 83, and the dotted arrow 108 associated with the subscriber-specific content 91 for the subscriber 84.

The embodiments in FIGS. 4-6 illustrate an approach in which a transmitting node periodically (for example, at certain regular time intervals) reports its node-specific activity to a subset of "interested" nodes for the purpose of maintaining a coherent model of a subset of the overall network state. The "interested" nodes may be those nodes that are currently serving the same content subscriber as the transmitting node. Thus, for example, if the node 58 is the node reporting its node-specific activity, then its corresponding "interested" nodes may be nodes 62 and 63 in the embodiment of FIG. 4 because each of these two nodes 62-63 has one subscriber common with the transmitting node 58. In one embodiment, the reporting node may multicast information about its node-specific activity to "interested nodes" in a manner similar to that used to multicast datagrams in an Internet Protocol (IP) network using the Internet Group Management Protocol (IGMP). As is known, IGMP can be used for one-to-many networking applications and allows for more efficient use of resources. In IGMP, hosts transmit multicast packets to a particular multicast address and the packets are then forwarded to the subset of hosts that are interested in that particular multicast address. Thus, in IGMP, routers know if they need to forward a multicast packet because routers have an internal model that is kept accurate by IGMP packets that tell the router which network links are interested in which multicast packets. In the embodiments of FIGS. 4-6, the CDN system 48 could layer its inter-node accounting communications on IP multicast and rely on the IGMP protocol to keep track of "interested" nodes in the CDN 48. In another embodiment, a protocol similar to IGMP may be implemented, but may be fine-tuned for the job of modeling the "interest" profile of the various CDN nodes. Thus, using multicasting (or a similar alternative) as an information-sharing approach, each node serving a specific subscriber can remain apprised of the bandwidth used/requested by another node serving the same subscriber. In this manner, a subscriber-specific coherent model of a subset of the overall network state may be maintained at each node serving a given subscriber.

FIG. 5 depicts an exemplary inter-node sharing of transmission accounting data according to one embodiment of the present disclosure when two CDN nodes deliver content to a single subscriber's devices at two different locations. In the embodiment of FIG. 5, a single subscriber is receiving adaptively-streamed multimedia content at two locations—at a first location where subscriber's home 84 is, and at a second location where subscriber's mobile phone 94 is present (which may be away from the home 84). The cell phone portion of the overall content is delivered by the CDN node 57 as illustrated using the solid arrow 111, whereas the remaining portion of the total multimedia content is delivered to one or more devices (not shown) in the subscriber's home 84 by the CDN node 62 as illustrated using the solid arrow 112. In FIG. 5, related inter-node reporting of accounting information (for example, using selective multicast discussed before) is illustrated using dotted arrows 114 and 115, respectively. In view of the detailed discussion of FIG. 4, and in view of FIG. 5 being a partial representation of FIG. 4 (to illustrate the multi-location delivery of streamed content), additional details for the configuration in FIG. 5 is not provided for the sake of brevity.

FIG. 6 is a combination of FIGS. 4 and 5. Because all messaging and content delivery shown in FIG. 6 are already discussed before with reference to FIGS. 4 and 5, additional discussion of FIG. 6 is not provided herein for the sake of brevity.

In another embodiment, instead of performing an interest-based multicast of accounting information to a subset of all the nodes in the CDN, a reporting node may rather globally broadcast node-specific accounting information to all the remaining nodes in the CDN. In this embodiment, each node in a CDN (for example, the CDN 48) may be configured to transmit details of its node-specific activity to all other nodes in the CDN at regular time intervals such as, for example, after 2 seconds of the occurrence of the qualifying node-specific activity. Some examples of such qualifying activity include transmission of a pre-determined number of bytes of a multimedia stream/segment, or generation of bandwidth-management related metadata information for the bandwidth consumed by the multimedia segment or estimated to be consumed while fulfilling a request from a user device having a certain priority assigned thereto. Upon receiving a report of node-specific activity occurring at the transmitting node, each other node in the CDN may then model the entire system/network as a whole in order to decide how to act according to a set of global bandwidth management rules. For example, with reference to FIG. 3, if multimedia streams 50-51 and 53-54 are already established and if the node 65 now receives a request for streaming content from the subscriber device 72, the node 65 may select only that ABR bitrate/bandwidth as "delivery bandwidth" to the device 72 which would maintain the total bandwidth of all of the multimedia streams (i.e., the summation of the bandwidths of each individual stream 50-51 and 53-54 and the "delivery bandwidth" to be allotted to the new stream 52 serving the device 72) being delivered to the subscriber's home 49 within the pre-defined household level bandwidth cap of 8 Mbps.

More specifically, as part of the global broadcast approach discussed above, each CDN node may transmit its current state to all other nodes in the CDN at given time intervals, thereby enabling all other nodes to directly know the state of the entire CDN network/system as a whole. Although such global broadcasting is not explicitly illustrated in FIGS. 4-6, it is understood that each of the node in the CDN 48 may be configured to perform global broadcast in addition to or in lieu of the selective multicast mentioned earlier, depending on the desired implementation. Thus, in the global broadcast approach, for example, if the reporting node is node 58, then it may periodically transmit its current state (which may include information about node-specific activity) to all of the other nodes in the CDN—i.e., nodes 57 and 59-65. While this may require little processing by the other nodes, such global broadcasting can run into race conditions as nodes process information which may no longer be applicable.

To ameliorate occurrence of a race condition in the global broadcasting approach, in another embodiment of the present disclosure, each CDN node transmits only those changes that have occurred since the last (i.e., immediately-preceding) time interval of reporting of node-specific activity. While this embodiment requires that each node progressively build the current state of the CDN network/system, it has the advantage of being resilient to race conditions. Nodes can now keep track of which time intervals they have information on for each node and request re-transmissions of corrupt or missing data.

Figure 7:
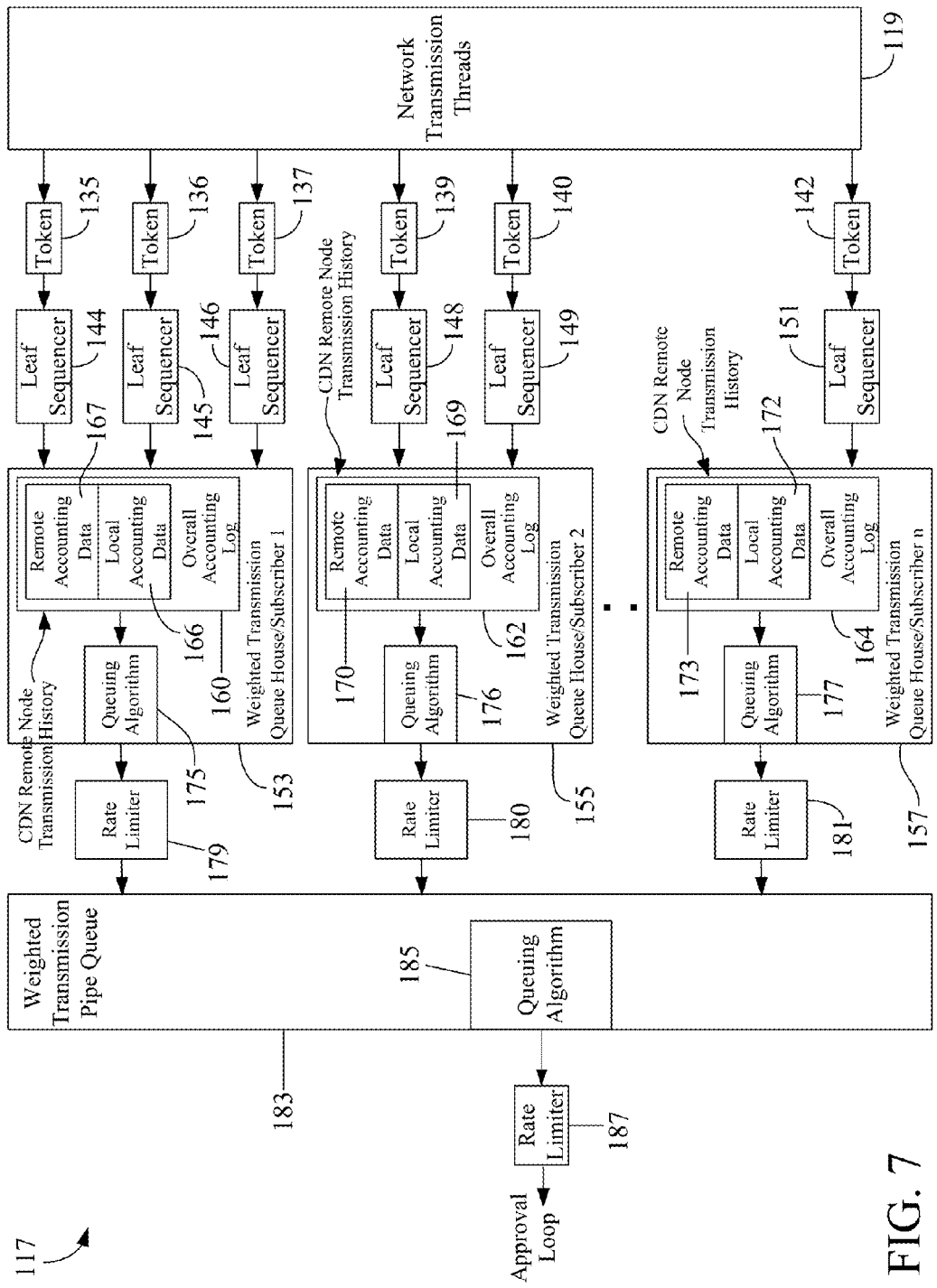
FIG. 7 illustrates how Weighted Fair Network Queuing approach may be implemented in a CDN node along with distributed accounting (of node-specific activity) according to particular embodiments of the present disclosure.
Figure 8:
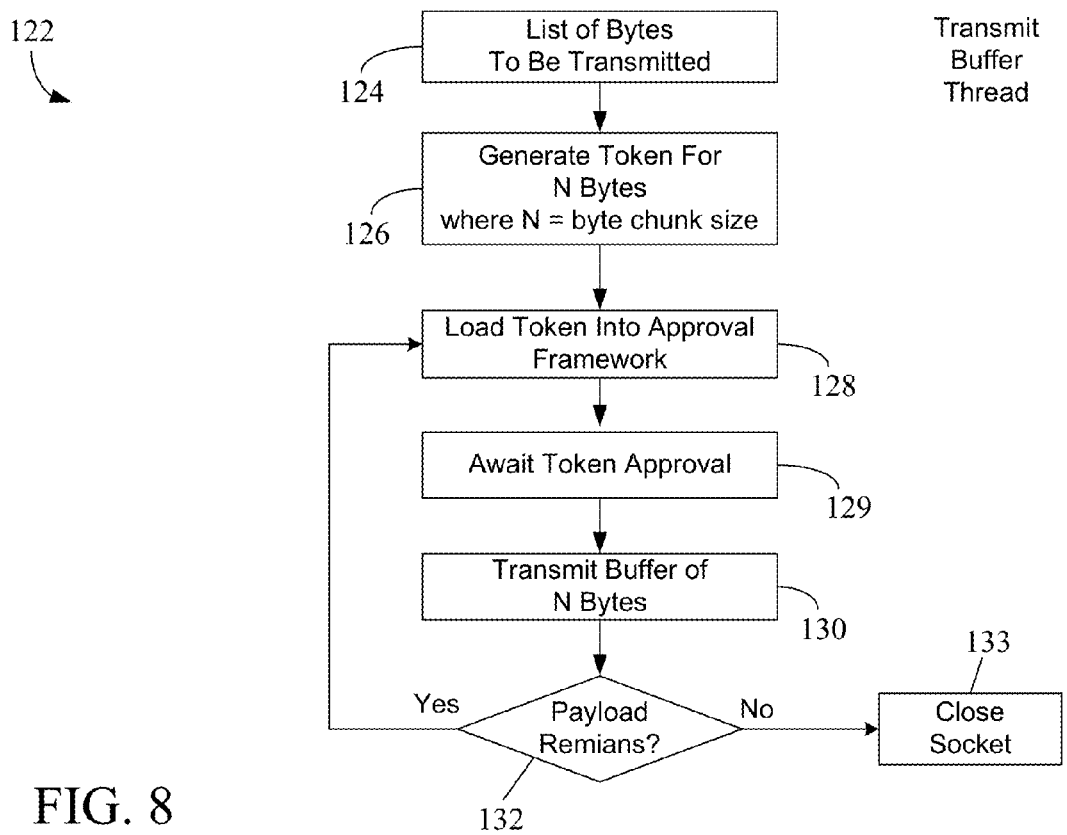
FIG. 8 shows a flowchart of steps for a token-based implementation of a transmit buffer thread in the CDN node of FIG. 7.

FIG. 7 illustrates how Weighted Fair Network Queuing approach may be implemented in a CDN node 117 along with distributed accounting (of node-specific activity) according to particular embodiments of the present disclosure. FIG. 8 shows a flowchart 122 of steps for a token-based implementation of a transmit buffer thread in the CDN node 117 of FIG. 7. The process illustrated in FIG. 8 may be implemented using a processor (not shown in FIG. 7, but discussed later with reference to FIG. 9) of the CDN node 117. The CDN node 117 may be any one of the nodes shown as part of the CDN 48 in FIG. 3. The CDN node 117 may include a pool of network transmission threads 119 that may implement the methodology shown in FIG. 8 (i) to generate a multimedia stream/segment specific token for each subscriber device being served by the CDN node 117, and (ii) upon approval of a token (as shown at block 129 in FIG. 8), to also release a pre-determined number ("N") of bytes of the device-requested multimedia content for the corresponding multimedia stream/segment. The flowchart 122 in FIG. 8 illustrates the operation of a transmit buffer thread for each subscriber device being served by the CDN node 117. As shown in FIG. 8, the thread pool 119 generates tokens (at block 126) representing the actual multimedia bytes to be transmitted to corresponding subscriber devices being served by the CDN node 117. For each "N" or other pre-determined number of bytes of device-specific multimedia content segment, a token may be generated at block 126. Here, "N" represents the byte chunk size (for example, the maximum number of bytes of data available for transfer). Each generated token may be then loaded into an "approval framework" (block 128) (which places tokens 135, 136, etc., in corresponding leaf sequencers 144, 145, etc.) to await approval (block 129) for transmission to the respective user device. An exemplary "approval framework" is discussed later below. At block 130, the "N" bytes of multimedia content associated with the corresponding token having been approved are passed to the operating system for transmission to the respective device. A "transmit thread" repeatedly generates tokens, awaits approval, and then transmits byte chunks. The process at blocks 128-130 may be repeated for each byte chunk until the payload of bytes constituting a device-specific multimedia content segment all have been transmitted, and no payload remains untransmitted (block 132). A multimedia stream-specific socket (not shown) in the CDN node 117 may be closed at block 133 if no payload (or streamed content) remains to be sent to a particular subscriber device.

In one embodiment, the above-mentioned "approval framework" may use a weighted transmission algorithm (for example, the earlier-mentioned Weighted Fair Network Queuing approach disclosed in the U.S. Pat. No. 8,549,570) to determine whether a token may be "approved" or not. Approval of a token allows the node 117 to transmit the associated bytes of multimedia content segment to the respective subscriber device. In one embodiment, the following Weighted Transmission Queuing algorithm may be used to determine whether a token should be approved or not. As before, a processor (not shown in FIG. 7, but discussed later with reference to FIG. 9) in the CDN node 117 may be configured to implement the algorithm. The algorithm may start with the following definitions:

(a) $Q_i$=transmission queue
(b) $Qa_{ik}$=a quantity of bytes for a previously-approved token "k" from queue $Q_i$
(c) $Qt_{ik}$=the time when the token "k" from queue $Q_i$ was approved for transmission
(d) $A_i$=sum($Qa_{ik}$)
(e) $Tb_i$=the number of bytes for the current token from queue $Q_i$
(f) $w_i$=weight factor for queue
(g) $x_i$=($A_i$+$Tb_i$)/$w_i$
and perform the following actions:
(h) approve token from $Q_i$, where $x_i$=min($x_j$)
(i) reconcile tokens according to weight In one embodiment, a token is "approved" so long as the delivery bandwidth needed by the respective CDN node to transmit corresponding bytes of multimedia content to a specific user device (taking weight-based control into account, as discussed below), when added to other multimedia streams being streamed to a specific subscriber, does not exceed a pre-determined bandwidth cap for that subscriber. Once a token is "approved," its corresponding bytes may be transmitted immediately (block 130) without fear of exceeding the bit rates embodied in the policy entities (187, 179, 180, 181) of the "approval framework" (which is part of the node 117 in the embodiment of FIG. 7). As noted earlier with reference to discussion of FIG. 3, a subscriber device may have a specific "priority" assigned to or associated with it. As also noted earlier, a customer may assign a device a higher priority because it is better able to render content at a higher bitrate than a device assigned a lower priority. In one embodiment, a device's "priority" status may determine the weight factor (i.e., "$w_i$" at definition (f) in the algorithm above) to be applied to the device-specific multimedia content stream or transmission queue currently pending for delivery to the device (i.e., "$Q_i$" at definition (a) in the algorithm above). As can be seen from the above algorithm, this is the transmission queue (of respective multimedia content) that is associated with the "approved" token. Thus, in one embodiment, a weight-based control can be used to divide a bandwidth cap among multiple transmission classes (i.e., priority-based transmissions of streamed content). In addition to providing bandwidth management, this may also allow for provisioning of QoS for different transmission classes based on the priority status of subscriber devices.

In FIG. 7, tokens for various device-specific multimedia segments are indicated by reference numerals 135-137, 139-140, and 142, and these tokens corresponding to device-specific multimedia segments are provided through respective leaf sequencers 144-146, 148-149, and 151. As shown in FIG. 7, different subscriber households may have different number of devices receiving multimedia content from the node 117. For example, a subscriber-1 may have three devices (not shown) receiving multimedia content and, hence, there are three transmit threads shown in conjunction with a first transmission queue management unit 153 in FIG. 7. Each transmit thread is indicated using a token and its corresponding leaf sequencer having buffered data associated with the token. Thus, in case of the unit 153, the three transmission threads are represented by the pairs of (i) blocks 135 and 144; (ii) blocks 136 and 145; and (iii) blocks 137 and 146. Similarly, a second subscriber (i.e., subscriber-2 in FIG. 7) may have two devices (not shown) receiving multimedia content and, hence, there are two transmit threads shown in conjunction with a second transmission queue management unit 155 in FIG. 7, and so on. Each transmission queue management unit in FIG. 7—i.e., units 153, 155, and 157—may include a corresponding accounting log or transmission history 160, 162, and 164, respectively. Each accounting log may contain corresponding local and remote accounting data as indicated by pairs of blocks 166-167, 169-170, and 172-173 respectively. In one embodiment, such subscriber-specific accounting logs may be generated and maintained in the manner discussed earlier with reference to FIGS. 4-6.

In one embodiment, each transmission queue management unit in the CDN node 117 may implement the entire program code or a relevant portion thereof for a queuing algorithm, such as the earlier-discussed Weighted Transmission Queuing algorithm (which may be implemented, for example, using a processor in the CDN node as also mentioned earlier), to determine the sequence of packet transmissions by repeatedly applying an action, such as the earlier-mentioned action (h), to (for example) $Q_1$=Leaf sequencer 144, $Q_2$=Leaf sequencer 145, $Q_3$=Leaf Sequence 146, etc., incorporating the data transmission activity ($Qa_{ik}$ and $Qt_{ik}$, as reflected in the subscriber-specific accounting log) at other nodes in the network. As noted earlier, the weights may determine each thread's share of allowable bandwidth, which may, in turn, depend on the bandwidths already being consumed by data streams from other nodes so as to control the transmitting node (here, the node 117) to maintain its content delivery to a specific subscriber within the subscriber-specific bandwidth cap (as indicated by "Rate Limiter" blocks 179-181 in FIG. 7). Blocks 175-177 in FIG. 7 represent such program code.

After the byte traffic control at respective rate limiters 179-181 to schedule corresponding data streams for delivery, the earlier-mentioned token "approval framework" may be implemented at a transmission pipe queue control unit 183. The token approval aspect discussed earlier with reference to the exemplary Weighted Transmission Queuing algorithm may be implemented using the respective program code (which may be executed, for example, by a processor in the CDN node as mentioned earlier) for that algorithm. Such program code is represented using the block 185 in FIG. 7. The program code at block 185 may ensure that the bandwidth in the overall pipe—i.e., the output of the rate limiter 187—is divided properly among the customers associated with rate limiters 179-181. The transmission of all the multimedia content associated with "approved" tokens may be controlled using a node-wide rate limiter 187. The final ABR-streamed content from the CDN node 117 may be then approved for delivery to the chosen one of the subscribers, and the process repeated for as long as any transmissions are active.

More generally, FIG. 7 represents a decision-making process. It is a tree of NestableSequencer implementations that model a set of households, each household containing multiple devices. In the embodiment of FIG. 7, three implementations of an abstract NestableSequencer interface are shown—(i) a first sequencer (like the Leaf Sequencers 144-146, 148-149, etc.) stores a token; (ii) a second sequencer (like the pipe queue 183), which may be a NestableSequencer in the form of an UnboundedFairNetworkQueuing(FNQ)Sequencer that selects a token using a queuing algorithm (like the earlier-mentioned Weighted Fair Network Queuing approach); and (iii) a third sequencer (like the rate limiter 187) which may be a NestableSequencer in the form of a ClampedSequencer that limits tokens so that byte transmissions do not exceed a chosen rate. A different kind of NestableSequencer interface may be devised that implements a different policy. (Different policies can be formed by arranging the NestableSequencer implementations in different topologies, possibly including other NestableSequencers not shown or implemented in the embodiment of FIG. 7.)

In the embodiment of FIG. 7, various transmission sessions may be pacing their transmissions by loading tokens into respective Leaf Sequencers and awaiting token "approval." In one embodiment, token "approval" happens when a token extracted from the "root element" (e.g., the entity 187 in FIG. 7) is marked as "approved." In FIG. 7, the entity 187 is a Rate Limiter, so it may indicate that it is not ready and may delay returning or "approving" a token until the bandwidth constraint is not violated. As an illustration, for example, if the entity 187 were configured with an 8 Mbps limit, and if each token represented 8000 bits, then the NestableSequencer 187 would return or "approve" up to 1000 tokens per second (assuming the lower layers provide tokens at that rate). It is noted here that during the token approval process, it may not be necessary that a token be present in each input thread. It might be that a transmission loop stalls waiting on disk Input/Output (I/O), or that a rate limiter concludes that it needs to wait before propagating tokens to enforce a bandwidth cap. In that case, the parent entity (here, the rate limiter 187) may ignore the threads that are not ready and may choose among the threads that are.

In the embodiment of FIG. 7, the NestableSequencer 187 gets its tokens from the next NestableSequencer in the hierarchy—i.e., the NestableSequencer 183. As mentioned earlier, the entity 183 may be an UnboundedFNQSequencer, which may pull tokens from its children NestableSequencers (here, the Leaf Sequencers 144-146, etc.) and approve them according to a weighted transmission queuing algorithm informed by the accounting history of those children. As also noted earlier, the purpose of each of the LeafSequencers 144-146, etc., is to hold a single token until it is approved. Thus, the token approval process is a process that is repeated throughout the hierarchy of NestableSequencers until finally a token is selected and approved. Then the process repeats again for the next token, and so on.

Thus, the present disclosure relates to CDN-based bandwidth management strategies/policies that incorporate accounting history of recent transmissions into a node's decision-making process. By distributing this accounting history throughout the CDN, individual nodes can make decisions about node-specific local actions which result in the implementation of a coherent overall policy. Without distribution of this accounting information, it is possible that the individual nodes could only implement more primitive policies. Rate limiting is achieved by controlling the timing of a packet transmission. The earlier-mentioned Weighted Fair Queuing (WFQ) approach manages the division of a bandwidth among multiple streams by controlling the sequence of packets transmitted. Assuming no bottlenecks in the thread pool 119, the WFQ approach will assign the same sequence of packets regardless of the rate limit. In addition to this "WFQ approach combined with rate limiting", other packet queuing and timing sequencing schemes that incorporate transmission accounting/history to choose a timing and sequence for competing transmissions could also benefit from the distributed accounting information (i.e., the combined local and remote activity logs) as per the teachings of the present disclosure.

From the above discussion it is seen that, according to the particular embodiments of the present disclosure, once each individual node has a model of what the entire CDN system is currently doing, that node can implement bandwidth management (such as the earlier-mentioned Weighted Fair Network Queuing) in a coherent manner. For example, a subscriber household requesting content from multiple CDN nodes will still have household level bandwidth caps implemented as if a single node were serving them. The present disclosure thus enables bandwidth management across CDN nodes while providing a solution for potential race conditions in the system. This enables network providers to provide bandwidth management schemas to ensure quality of service (QoS) to both the end user and the content owner.

Figure 9:
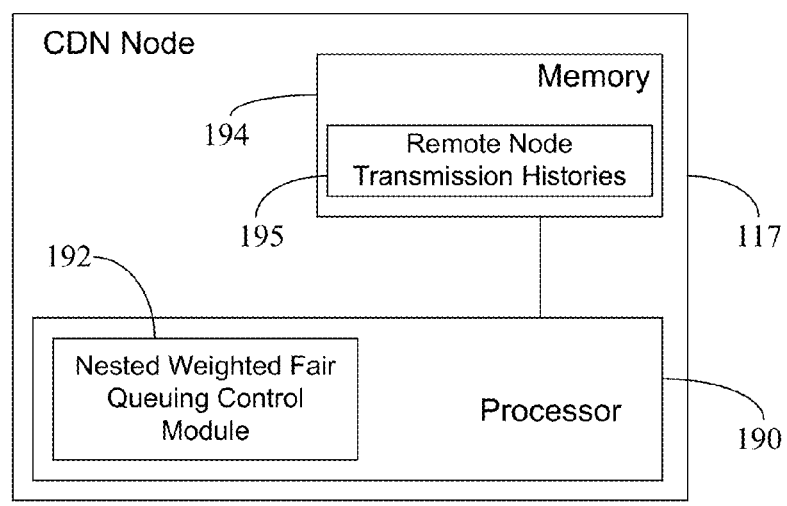
FIG. 9 is an exemplary block diagram of a CDN node according to one embodiment of the present disclosure.

FIG. 9 is an exemplary block diagram of a CDN node (for example, the CDN node 117 in FIG. 7) according to one embodiment of the present disclosure. As mentioned earlier, the CDN node 117 may represent any of the CDN nodes shown in the CDN 48 of FIG. 3. In one embodiment, the CDN node 117 may include a processor 190, which may be configured (either through hardware and/or software) to enable the node 117 to perform various functionalities discussed hereinbefore with reference to discussion of FIGS. 2 through 8. In one embodiment, the processor 190 may include suitable program code as part of a nested weighted fair queuing control module 192. Upon execution of the program code by the processor 190, the processor may configure the CDN node 117 to perform various bandwidth management (for example, through inter-node transmission of information about node-specific activity) and QoS related tasks discussed hereinbefore with reference to FIGS. 2 through 8. Thus, for example, the program code in the module 192 may configure the processor 190 to implement the earlier-described token "approval framework" throughout various transmission threads in the node 117. As another example, the program code in the module 192 may further configure the processor 190 (and, hence, the node 117) to perform either global broadcast of node-specific bandwidth accounting information or the interest-based multicast of accounting information, as applicable. The processor 190 may be coupled to a memory 194, which, in one embodiment, may store multimedia content/data for transmission. The memory 194 may also store remote node transmission histories 195 as part of subscriber-specific accounting logs (discussed earlier, for example, with reference to FIG. 7). The program code in the module 192 in the processor 190 may access the memory 117 for such transmission histories, multimedia content, and other relevant data to accomplish the bandwidth management and QoS-provisioning according to the teachings of the particular embodiments of the present disclosure explained with reference to FIGS. 2-8. In one embodiment, the control module 192 may instead reside in the memory 194, which may also contain additional program code for execution by the processor 190 to enable the processor (and, hence, the node 117) to carry out various functionalities associated with bandwidth management and QoS-provisioning according to the teachings of the present disclosure.

In one embodiment, the memory 194 may be a separate unit—i.e., not an internal part of the CDN node 117 (as in FIG. 9). In another embodiment, the memory 194 may function as a database, which may be shared with other nodes in a CDN. The processor 190 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 190 may employ distributed processing in certain embodiments.

As mentioned earlier, the processor 190 may be configured in hardware and/or software to perform various functionalities noted hereinbefore. For example, when existing hardware architecture of the processor 190 cannot be modified, the functionality desired of the processor 190 may be obtained through suitable programming of the processor 190. The execution of the program code (by the processor 190) may cause the processor to perform as needed to support the bandwidth management solutions as per the teachings of the present disclosure. Thus, although the processor 190 (and, hence, the node 117) may be referred to as "performing," "accomplishing," or "carrying out" (or similar such other terms) a function or a process or a method step, such performance may be technically accomplished in hardware and/or software as desired. The CDN network operator or a third party (for example, manufacturer or supplier of the CDN node 117) may suitably configure the node 117 (for example, through hardware and/or software based configuration of the processor 150) to operate as per the particular requirements of the present disclosure discussed above.

Some or all of the functionalities described above and earlier with reference to FIGS. 2-8 as being provided by a CDN node may be provided by the processor 190 executing instructions stored on a computer-readable data storage medium, such as the memory 194 shown in FIG. 9. Hence, some or all aspects of a node-specific functionality described herein (related to bandwidth management and QoS provisioning for a CDN-delivered ABR multimedia content) may be implemented in a computer program, software, or firmware incorporated in a computer-readable storage medium such as the memory 194 in FIG. 9 for execution by a general purpose computer or a processor such as the processor 190. In one embodiment, the computer-readable data storage medium may be a non-transitory data storage device. Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 194 may employ distributed data storage with/without redundancy.

Alternative embodiments of the CDN node 117 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements.

The foregoing describes a system and a method in which each node in a CDN maintains information about the most-recent state of the CDN as a whole in order to decide what bandwidth to use when serving a content subscriber so that the total bandwidth of the entire content delivered to the subscriber through various nodes in the CDN remains within a pre-defined bandwidth cap for the subscriber. In one embodiment, each node in a CDN transmits to all other nodes in the CDN, at regular time intervals, information about any activity that occurs at the transmitting node. In another embodiment, instead of transmitting details of node-specific activity to every other node, the transmitting node may rather report the requisite information to a subset of "interested" nodes. Thus, a reporting node may either globally broadcast node-specific bandwidth accounting information or may perform interest-based multicast of accounting information. Once each individual node has a model of what the entire CDN system is currently doing, that node can implement bandwidth management in a coherent manner. For example, a subscriber household requesting content from multiple CDN nodes will still have household level bandwidth caps implemented as if a single node were serving them. This enables network providers to provide bandwidth management schemas to ensure quality of service (QoS) to both the end user and the content owner.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of managing a total bandwidth allocated to a content subscriber receiving multimedia content from a subset of a plurality of Content Distribution Network (CDN) nodes in a CDN, wherein the method is performed in a first CDN node serving the content subscriber and comprises:
    receiving from each of the plurality of CDN nodes in the CDN, each CDN node's node-specific activity, wherein each CDN node's node-specific activity includes an indication of an individual bandwidth, if any, utilized by each of the plurality of CDN nodes to provide a corresponding portion of the multimedia content to the content subscriber;
    utilizing the indication of individual bandwidth, received from each of the plurality of CDN nodes, to identify from the plurality of CDN nodes in the CDN, the subset of CDN nodes sending multimedia content to the content subscriber;
    calculating a delivery bandwidth for providing the first CDN node's node-specific portion of the multimedia content to the content subscriber, wherein the delivery bandwidth is calculated to cause the total bandwidth, utilized by the subset of CDN nodes to provide the multimedia content to the content subscriber, to remain within a pre-defined bandwidth cap for the content subscriber, wherein the total bandwidth is a summation of the first CDN node's calculated delivery bandwidth and each individual bandwidth utilized by each of the other CDN nodes in the subset serving the content subscriber; and
    providing to the content subscriber, the first CDN node's node-specific portion of the multimedia content using the calculated delivery bandwidth;
    wherein the step of calculating the delivery bandwidth includes:
        receiving a priority value assigned to the content subscriber;
        generating a weight value corresponding to the content subscriber based at least in part upon the priority value assigned to the content subscriber; and
        regulating, by a weighted fair queuing (WFQ) transmission queue management unit, the delivery bandwidth allocated to a virtual pipe from the subset of CDN nodes to the content subscriber based on the weight value corresponding to the content subscriber;
    wherein calculating the delivery bandwidth for providing the first CDN node's node-specific portion of the multimedia content to the content subscriber also includes:
        allocating weights to each of a plurality of devices associated with the content subscriber based on a respective priority level of each device;
        dividing the pre-defined bandwidth cap among the plurality of devices based on the allocated weights, wherein the pre-defined bandwidth cap is divided to provide a portion of the total bandwidth to each subscriber-associated device in direct proportion to each device's respective priority level; and
        limiting the delivery bandwidth for a given subscriber-associated device to the portion of the total bandwidth provided according to the respective priority level of the given subscriber-associated device.

2. The method of claim 1, further comprising:
    the first CDN node periodically reporting a most-recent state of the first CDN node's node-specific activity to at least the subset of CDN nodes in the CDN also serving the content subscriber.

3. The method of claim 2, wherein the first CDN node's node-specific activity includes a number of bytes of the multimedia content transmitted to the content subscriber by the first CDN node.

4. The method of claim 2, wherein periodically reporting the most-recent state of the first CDN node's node-specific activity further includes:

the first CDN node periodically transmitting to at least the subset of CDN nodes in the CDN serving the content subscriber, only information about node-specific activity occurring at the first CDN node in a time period following an immediately-preceding node-specific activity report transmitted by the first CDN node.

5. A method in a Content Distribution Network (CDN) of managing a total bandwidth allocated to a content subscriber receiving multimedia content from a subset of serving CDN nodes in a plurality of CDN nodes in the CDN, wherein the method comprises:
each CDN node in the CDN determining from indications of node-specific activity received from other CDN nodes in the CDN, the subset of serving CDN nodes sending multimedia content to the content subscriber;
each serving CDN node in the subset periodically reporting to at least the other serving CDN nodes in the subset also serving the content subscriber, an individual bandwidth utilized by the serving CDN node to provide a corresponding portion of the multimedia content to the content subscriber;
each serving CDN node in the subset using data from the periodic reporting to determine an individual bandwidth at which each of the other serving CDN nodes in the subset is providing a corresponding portion of the multimedia content to the content subscriber;
each serving CDN node in the subset calculating a delivery bandwidth for providing the serving CDN node's node-specific portion of the multimedia content to the content subscriber, wherein the delivery bandwidth is calculated to cause the total bandwidth, utilized by the serving CDN nodes in the subset to provide the multimedia content to the content subscriber, to remain within a pre-defined bandwidth cap for the content subscriber, wherein the total bandwidth is a summation of the serving CDN node's calculated delivery bandwidth and each individual bandwidth utilized by each of the other serving CDN nodes in the subset serving the content subscriber; and
each serving CDN node in the subset providing to the content subscriber, the serving CDN node's node-specific portion of the multimedia content using the calculated delivery bandwidth;
wherein the step of each serving CDN node in the subset calculating the delivery bandwidth includes:
receiving a priority value assigned to the content subscriber;
generating a weight value corresponding to the content subscriber based at least in part upon the priority value assigned to the content subscriber; and
regulating, by a weighted fair queuing (WFQ) transmission queue management unit, the delivery bandwidth allocated to a virtual pipe from the subset of CDN nodes to the content subscriber based on the weight value corresponding to the content subscriber;
wherein calculating the delivery bandwidth for providing the first CDN node's node-specific portion of the multimedia content to the content subscriber also includes:
allocating weights to each of a plurality of devices associated with the content subscriber based on a respective priority level of each device;
dividing the pre-defined bandwidth cap among the plurality of devices based on the allocated weights, wherein the pre-defined bandwidth cap is divided to provide a portion of the total bandwidth to each subscriber-associated device in direct proportion to each device's respective priority level; and
limiting the delivery bandwidth for a given subscriber-associated device to the portion of the total bandwidth provided according to the respective priority level of the given subscriber-associated device.

6. The method of claim 5, wherein when the number of CDN nodes serving the content subscriber changes, thereby creating a new subset of serving CDN nodes, the method further comprises:
each serving CDN node in the new subset of serving CDN nodes calculating a new delivery bandwidth for providing the serving CDN node's node-specific portion of the multimedia content to the content subscriber, wherein the new delivery bandwidth is calculated to cause the total bandwidth, utilized by the new subset of serving CDN nodes to provide the multimedia content to the content subscriber, to remain within the pre-defined bandwidth cap for the content subscriber.

7. A first Content Distribution Network (CDN) node for managing a total bandwidth allocated to a content subscriber that receives multimedia content from a subset of a plurality of CDN nodes in the CDN through adaptive streaming, wherein the first CDN node is one of the subset of CDN nodes serving the content subscriber, said first CDN node including a processor and a memory for storing computer program instructions, which, when executed by the processor, cause the first CDN node to:
periodically receive from each of the plurality of CDN nodes in the CDN, each CDN node's node-specific activity, wherein each CDN node's node-specific activity includes an indication of an individual bandwidth, if any, utilized by each of the plurality of CDN nodes to provide a corresponding portion of the multimedia content to the content subscriber;
utilize the indication of individual bandwidth, received from each of the plurality of CDN nodes, to identify from the plurality of CDN nodes in the CDN, the subset of CDN nodes sending multimedia content to the content subscriber;
calculate a delivery bandwidth for providing the first CDN node's node-specific portion of the multimedia content to the content subscriber, wherein the delivery bandwidth is calculated to cause the total bandwidth, utilized by the subset of CDN nodes to provide the multimedia content to the content subscriber, to remain within a pre-defined bandwidth cap for the content subscriber, wherein the total bandwidth is a summation of the first CDN node's calculated delivery bandwidth and each individual bandwidth utilized by each of the other CDN nodes in the subset serving the content subscriber; and
provide to the content subscriber, the first CDN node's node-specific portion of the multimedia content using the calculated delivery bandwidth;
wherein the first CDN node is configured to calculate the delivery bandwidth by performing the steps of:
receiving a priority value assigned to the content subscriber;
generating a weight value corresponding to the content subscriber based at least in part upon the priority value assigned to the content subscriber; and
regulating, by a weighted fair queuing (WFQ) transmission queue management unit, the delivery bandwidth allocated to a virtual pipe from the subset of CDN nodes to the content subscriber based on the weight value corresponding to the content subscriber;
wherein the first CDN node is further configured to calculate the delivery bandwidth by performing the steps of:
allocating weights to each of a plurality of devices associated with the content subscriber based on a respective priority level of each device;
dividing the pre-defined bandwidth cap among the plurality of devices based on the allocated weights, wherein the pre-defined bandwidth cap is divided to provide a portion of the total bandwidth to each subscriber-associated device in direct proportion to each device's respective priority level; and
limiting the delivery bandwidth for a given subscriber-associated device to the portion of the total bandwidth provided according to the respective priority level of the given subscriber-associated device.

8. The first CDN node of claim 7, wherein the program instructions, when executed by the processor, cause the first CDN node to provide the first CDN node's node-specific activity to at least the subset of CDN nodes in the CDN also serving the content subscriber, wherein the first CDN node's node-specific activity includes a number of bytes of the multimedia content transmitted to the content subscriber by the first CDN node.

9. The first CDN node of claim 7, wherein the program instructions, when executed by the processor, cause the first CDN node to periodically report a most-recent state of the first CDN node's node-specific activity by:
periodically transmitting to only the subset of CDN nodes serving the content subscriber, only information about node-specific activity occurring at the first CDN node since an immediately-preceding node-specific activity report transmitted by the first CDN node.

* * * * *